(12) United States Patent
Lindoff et al.

(10) Patent No.: US 6,725,024 B1
(45) Date of Patent: Apr. 20, 2004

(54) OFFSET LOCAL OSCILLATOR FREQUENCY

(75) Inventors: Bengt Lindoff, Bjärred (SE); Dennis Hui, Cary, NC (US); Kambiz Casey Zangi, Durham, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 528 days.

(21) Appl. No.: 09/706,744

(22) Filed: Nov. 7, 2000

(51) Int. Cl.$^7$ .................................................. H04B 1/06
(52) U.S. Cl. ...................... 455/255; 455/318; 455/323; 375/344
(58) Field of Search ................... 455/296, 309, 455/310, 312, 313, 317, 323, 324, 192.1, 192.2, 255, 256, 257, 318; 375/344

(56) References Cited

U.S. PATENT DOCUMENTS

| | | |
|---|---|---|
| 4,628,518 A | 12/1986 | Chadwick et al. |
| 4,712,222 A | 12/1987 | Heard et al. |
| 4,944,025 A * | 7/1990 | Gehring et al. ............. 455/207 |
| 5,091,921 A | 2/1992 | Minami |
| 5,214,795 A | 5/1993 | Suter |
| 5,287,388 A | 2/1994 | Ogura et al. |
| 5,548,244 A * | 8/1996 | Clewer ........................ 329/318 |
| 5,732,113 A | 3/1998 | Schmidl et al. |
| 5,732,339 A | 3/1998 | Auvray et al. |
| 5,828,955 A | 10/1998 | Lipowski et al. |
| 5,838,736 A | 11/1998 | Thomas et al. |
| 5,850,598 A | 12/1998 | Behrent |
| 5,867,059 A * | 2/1999 | Huang et al. ................ 329/302 |
| 5,896,061 A | 4/1999 | Behrent |
| 5,933,059 A * | 8/1999 | Asokan ........................ 331/18 |
| 5,946,360 A * | 8/1999 | Habbab et al. .............. 375/331 |
| 5,974,305 A | 10/1999 | Matero |
| 6,035,186 A | 3/2000 | Moore et al. |
| 6,148,047 A * | 11/2000 | Mohindra ..................... 375/346 |
| 6,370,205 B1 * | 4/2002 | Lindoff et al. ............... 375/319 |

FOREIGN PATENT DOCUMENTS

| | | |
|---|---|---|
| DE | 19606102 A1 | 8/1997 |
| GB | 2347284 A | 8/2000 |
| WO | WO98/25351 | 6/1998 |
| WO | WO01/31867 A1 | 5/2001 |

OTHER PUBLICATIONS

E. Larson, "RF and Microwave Circuit Design for Wireless Communications", Artech House Inc., Norwood, MA, USA 1997, pp. 74–76.
L. Ljung, "System Identification—Theory for the User", Prentice Hall Inc., New Jersey USA, 1987, 183–184.

* cited by examiner

Primary Examiner—Quochien B. Vuong
(74) Attorney, Agent, or Firm—Burns, Doane, Swecker & Mathis, L.L.P.

(57) ABSTRACT

A method and apparatus for offsetting the frequency of a local oscillator in a receiver are disclosed. The local oscillator frequency is offset with an offset frequency that depends on the training sequence used. Training symbols are inputted to the control unit. The control unit then provides an offset frequency depending on the training symbol received. A rotation of the baseband signal, proportional to the offset frequency, is introduced which later is digitally compensated for. Upon reception of the signal, a DC offset is introduced in the radio part. The digital compensation transforms this DC offset, in the baseband signal, to a rotating signal. The rotating DC offset signal is then subtracted in the baseband processing.

18 Claims, 3 Drawing Sheets

OFFSET LOCAL OSCILLATOR FREQUENCY

BACKGROUND

The invention relates to data communication systems, more particularly to all areas where radio receivers and channel estimators are used in digital systems, and even more particularly to methods and apparatuses that process a received radio signal that is characterized by an unwanted DC component.

Modern cellular systems, such as the GSM system, are based on digital communication. In order to cope with distortions, such as multi-path distortions, known symbol patterns, called training sequences, are sent at regular intervals. For instance in either of the GSM or future EDGE systems, which are Time Division Multiple Access (TDMA) systems, a training sequence is transmitted in each burst. The training sequence is used for synchronization, (i.e., to find the time position of the received sequence), and for estimation of the radio channel (i.e., to estimate the multi-path and fading characteristics of the radio channel). The radio channel and synchronization information are then used in the decoding process of the received signal. The training sequences are often chosen in such a way that the synchronization and channel estimation procedures are optimized for a radio receiver having some assumed ideal characteristics. For instance, in GSM or EDGE there are eight different predefined training sequences which are chosen such that the uncertainty in the synchronization position and channel estimation is minimized for the case in which the received signal is distorted only by inter-symbol interference (ISI) and white noise.

However, many practical receivers introduce other kinds of distortions. For instance, using a homodyne receiver, which is a very efficient receiver architecture from a cost, size and current consumption perspective, an unwanted DC offset is often introduced in the receiver that must be taken care of. The DC offset arises mainly from three different sources: (1) transistor mismatch in the signal path; (2) the Local Oscillator (LO) signal leaking and self-downconverting to DC through the mixer; and (3) a large near-channel interferer leaking into the LO and self-downconverting to DC (see, for example, E. Larson, "RF and Microwave Circuit Design for Wireless Communications", Artech House Inc., Norwood, Mass., USA, 1996).

An exemplary technique for addressing such a DC offset is to extend the channel filter model with a DC tap. In FIG. 1A a conventional homodyne receiver with a DC offset and channel estimator and channel equalizer for use in a burst transmission system, such as the GSM or the EDGE systems, is shown. The received signal is first filtered by a bandpass filter (BPF) 10 designed to pass only the desired frequency band (for instance the GSM frequency band). The signal is then amplified in a low noise amplifier (LNA) 12. The output from the LNA 12 is a signal given as:

$$s_t = r_f \cos(\omega t + \phi_t)$$

where $\omega$ is the carrier frequency, $r_t$ is the amplitude and $\phi_t$ is the phase information. This signal is down-converted to baseband In-phase (I) and Quadrature phase (Q) components in the mixers 20 and 30, respectively. The local oscillator (LO) 14 generates a local oscillator frequency adapted to the carrier frequency of the desired signal. The I and Q components are then low-pass filtered (LPF), by respective filters 22 and 32, and converted to a digital signal, by respective Analog to Digital (A/D) converters 24 and 34, and digitally low-pass filtered again, by respective filters 26 and 36, to obtain a signal format that can be handled by a Data Recovery (DR) unit 16 that demodulates the received signal.

Referring to FIG. 1B, the data recovery unit 16 works as follows. The complex valued baseband signal supplied to the DR unit 16 can be written as:

$$y_t = I_t + jQ_t + I_{DC} + jQ_{DC} = \sum_{i=0}^{L} h_i u_{t-i} + m + e_t. \quad (1)$$

where $h_i$ are the channel filter taps, $u_t$ is the transmitted symbol, m is the unknown DC component generated in the radio receiver, and $e_t$ is a white noise sequence (i.e., a sequence of independent random variables with zero mean). The baseband signal is supplied to a synchronization and channel estimation unit 50, which correlates the baseband signal (which is known to include a training sequence within the burst) with the known training sequence (TS) 60 in order to find the synchronization position. The synchronization and channel estimation unit 50 also estimates the DC offset and channel filter taps by means of known techniques, for instance by using a Least Squares (LS) algorithm. When using least squares, the channel estimate can be written according to:

$$\hat{H} = \left(\sum_{k=L+1}^{N_{TS}} U_k U_k^T\right)^{-1} \sum_{k=L+1}^{N_{TS}} U_k y_{k+\tau_{sync}} \quad (2)$$

where $\hat{H} = [\hat{h}_0, \ldots, \hat{h}_L, \hat{m}]^T$, $U_k = [u_k, \ldots, u_{k-L}, 1]^T$, $N_{TS}$ is the number of training symbols, and $\tau_{sync}$ is the synchronization position. The estimated DC offset is then subtracted from the baseband signal and the resultant signal $\tilde{y}_t = y_t - \hat{m}$ is fed to an equalizer 70 that uses the estimated channel filter taps to decode the signal.

Due to the need for estimating both the channel filter taps and DC offset in the presence of DC in the received signal, the optimized estimation characteristics for the training sequences are not realized, resulting in a different receiver performance for different training sequences used. The performance difference is due to the uncertainty (i.e., the variance) of the parameter estimate, which is proportional to the diagonal element of the matrix given as:

$$A = \left(\sum_{k=L+1}^{N_{TS}} U_k U_k^T\right)^{-1}.$$

From a theoretical point of view, in order to have good parameter estimates, one should choose the input vector $U_t$ such that the matrix A is a diagonal matrix with identical or very close diagonal elements. (see, for example, L. Ljung, "System Identification—Theory for the User", Prentice Hall Inc., New Jersey, 1987). The training sequences in EDGE and GSM assume that no DC component is present, and are chosen such that A is close to diagonal implying good estimation performance. However, a DC tap introduced in the U vector can cause the matrix to be far from a diagonal matrix, which results in a large performance loss due to bad channel and DC tap estimates. Therefore, a method that can enhance the synchronization and channel estimation procedure despite the existence of distortions such as a DC offset is needed.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

The current invention overcomes the prior art limitations by providing a method and apparatus that offsets the frequency of a local oscillator in a radio receiver by an offset frequency wherein the offset frequency is based on a training sequence. The method and apparatus for generating a local oscillator frequency in a radio receiver comprises controlling the local oscillator such that it generates a signal having the local oscillator frequency that is equal to a carrier frequency of a received signal plus an offset frequency, wherein the offset frequency is based on a training sequence included in the received signal.

The above features and advantages of the invention will be more apparent and additional features and advantages of the invention will be appreciated from the following detailed description of the invention made with reference to the drawings.

BRIEF DESCRIPTION OF THE DRAWINGS

The invention will now be described with reference to the following figures, in which.

DETAILED DESCRIPTION

Before addressing the specifics of the various embodiments of the invention a brief overview of the invention will be provided. The following description makes reference to a homodyne receiver architecture. However, one skilled in the art will appreciate that the invention is not limited to applications in homodyne receivers, but rather may be practiced in any system wherein the received signal includes a training sequence and a DC offset. The invention is particularly suited for radio receivers where an unwanted DC offset is often introduced in the receiver.

The invention proposes methods and apparatus for offsetting the local oscillator frequency in a radio receiver based on which training sequence is used in a communication system. By offsetting the local oscillator frequency with an offset frequency that depends on the training sequence used, a rotation, proportional to the offset frequency, of the baseband signal is introduced which enhances both the synchronization and the channel and DC offset estimation done in a synchronization and channel estimation unit. Better synchronization and channel and DC estimates, in turn, increase the performance of the radio receiver, providing the user with a higher throughput.

Figure 1A:
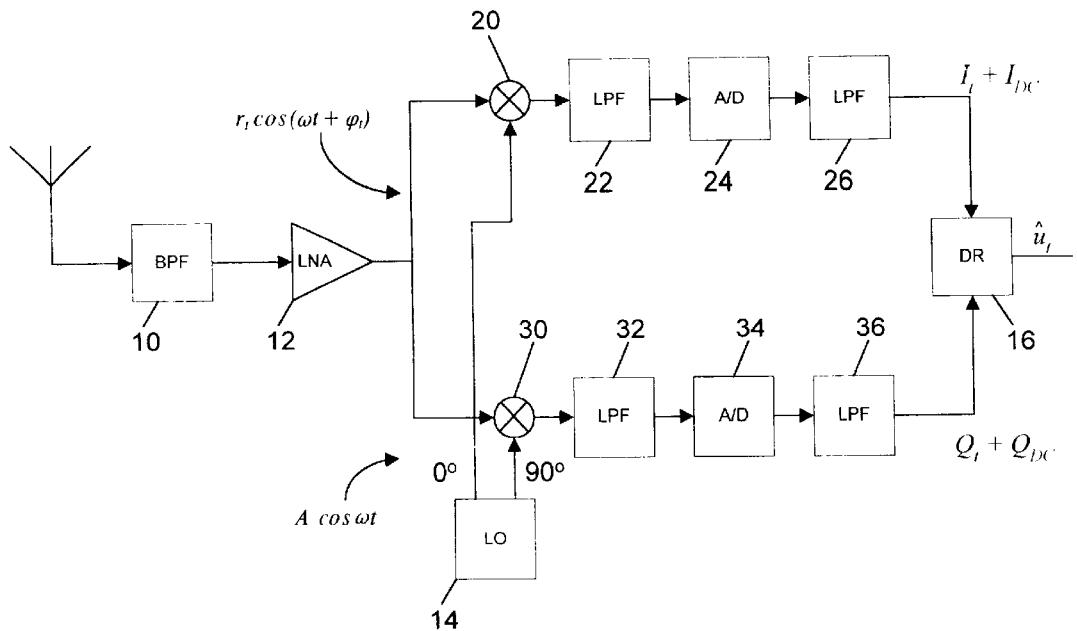
FIG. 1A is a block diagram of a conventional homodyne receiver with a channel and DC offset estimator.
Figure 1B:
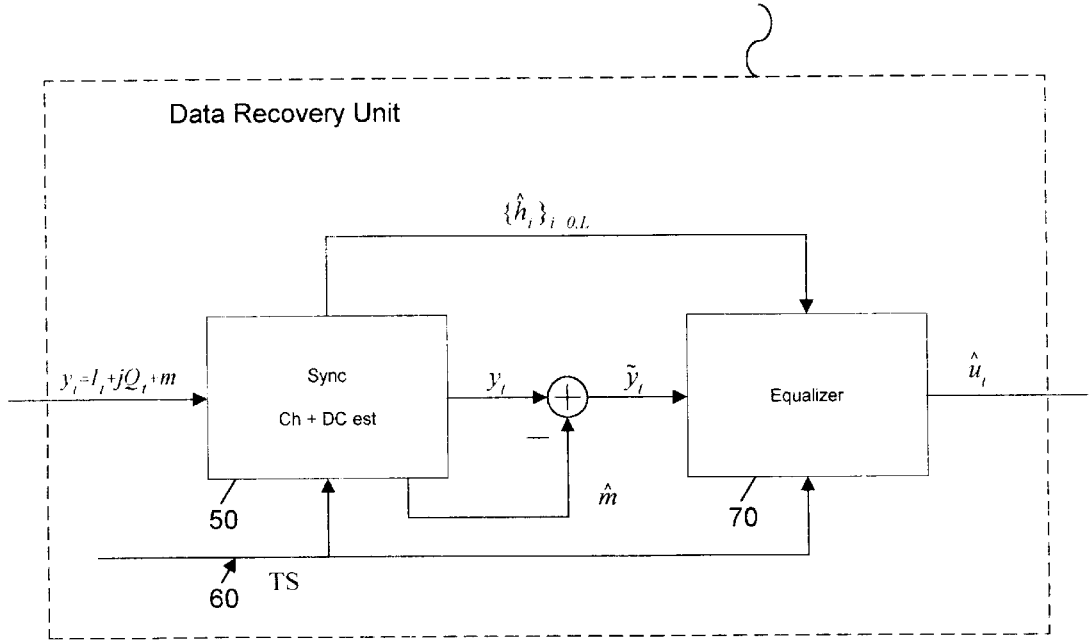
FIG. 1B is a block diagram of a data recovery unit of a conventional homodyne receiver.
Figure 2A:
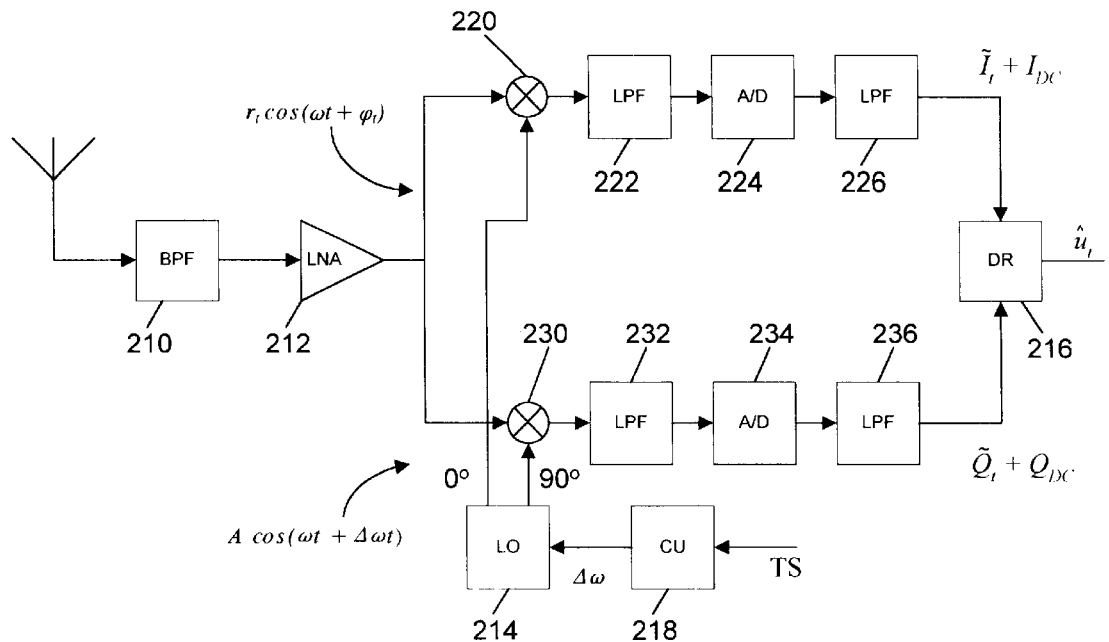
FIG. 2A is a block diagram of a homodyne receiver with an enhanced channel and DC offset estimator of the invention.

Referring to FIG. 2A, the received signal is first filtered by a bandpass filter (BPF) 210 designed to pass only the desired frequency band (for instance the GSM frequency band). The signal is then amplified in a low noise amplifier (LNA) 212. The output from the LNA 212 is a signal given as:

$$S_t = r_t \cos(\omega t + \phi_t)$$

where $\omega$ is the carrier frequency, $r_t$ is the amplitude and $\phi_t$ is the phase information. This signal is down-converted to baseband In-phase (I) and Quadrature phase (Q) components in the mixers, 220 and 230, respectively. The local oscillator (LO) 214 that supplies signals to each of the mixers 220 and 230 provides a frequency that is adapted not only to the carrier frequency of the wanted signal but also to the training sequence used. The training sequence information is fed to a control unit (CU) 218 that chooses an offset frequency, $\Delta\omega$, depending on the particular training sequence used. The relationship between the offset frequency and the training sequence can be predetermined. Thus, the information is fed to a control unit (CU) 218 that chooses an offset frequency, $\Delta\omega$, depending on the particular training sequence used. The relationship between the offset frequency and the training sequence can be predetermined. Thus, the information relating each training sequence to an offset frequency can be stored in a device, such as a look-up table and the like, for retrieval by the control unit 218. The frequency offset, which has been computed for each training sequence based on optimizing the channel estimation performance, is very small compared to the carrier frequency. For example, in the EDGE or GSM system with carrier frequencies around 900 or 1800 MHZ, the offset is around ±10 kHz depending on the training sequence.

The I and Q components are then low-pass filtered (LPF), by respective filters 222 and 232, and converted to digital signals, by respective Analog to Digital (A/D) converters 224 and 234, and digitally low-pass filtered again, by respective filters 226 and 236, to obtain a signal format that can be utilized by the Data recovery (DR) unit 216 that demodulates the received signal.

Figure 2B:
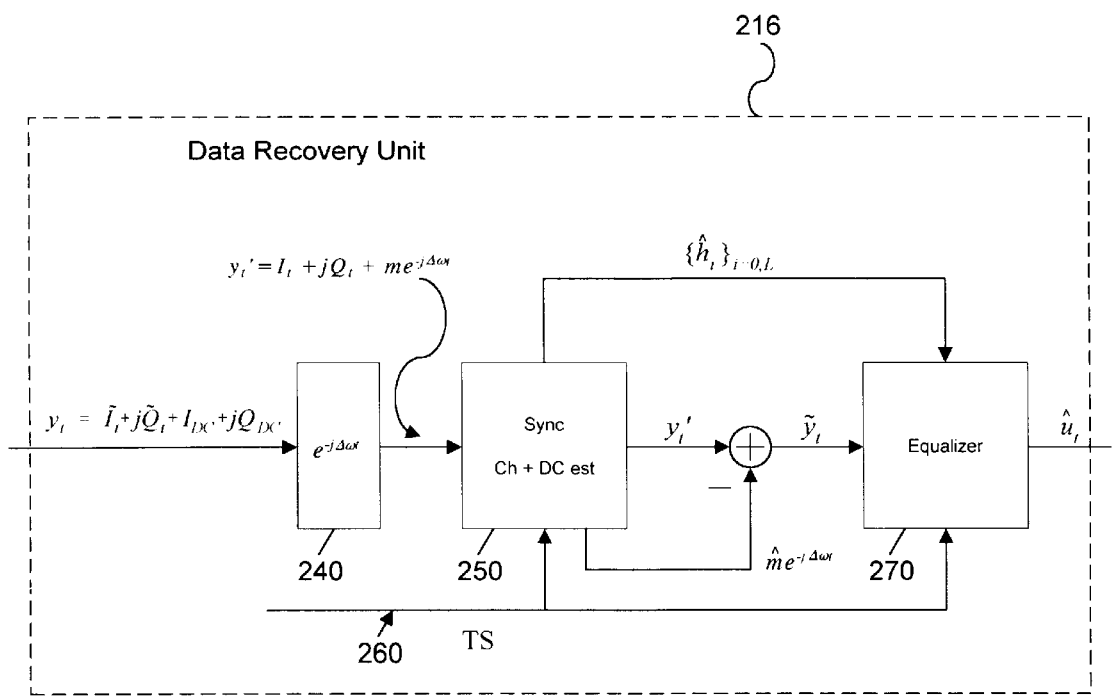
FIG. 2B is a block diagram of a data recovery unit of the invention.

Referring to FIG. 2B, the data recovery unit works as follows. The baseband signal supplied to the DR 216 can be written as:

$$y_t = \tilde{I}_t + j\tilde{Q}_t + I_{DC} + jQ_{DC} = \left(\sum_{i=0}^{L} h_i u_{t-i}\right) e^{j\Delta\omega t} + m + e_t \quad (3)$$

where $h_i$ are the channel filter taps, $u_t$ is the transmitted symbol, m is the unknown DC component generated in the radio receiver, $e_t$ is a white noise sequence (i.e., a sequence of independent random variables with zero mean) and $e^{j\Delta\omega t}$ is the offset frequency introduced in the LO. In order to compensate for the frequency offset introduced by the CU 218 via the LO 214, a digital de-rotation of the signal is done, that is, the received sequence is multiplied by $e^{-j\Delta\omega t}$, by the digital de-rotator 240. The output from the de-rotator can then be written as:

$$y_t = \sum_{i=0}^{L} h_i u_{t-i} + m e^{-j\Delta\omega t} + e_t. \quad (4)$$

Note that the DC offset of level m has now been transformed into a rotating signal with amplitude m. A synchronization is then performed by the synchronization and channel estimation unit 250. By performing the synchronization, the de-rotated baseband signal (which is known to include a training sequence within the burst) is correlated with the known training sequence (TS) 260 in order to find the synchronization position. The amplitude of the rotating signal and channel filter taps are also estimated by the synchronization and channel estimation unit 250. This is accomplished by using known techniques, such as a Least Squares (LS) algorithm and the like. When using least squares, the estimate can be written as:

$$\hat{H} = \left(\sum_{k=L+1}^{N_{TS}} U_k U_k^T\right)^{-1} \sum_{k=L+1}^{N_{TS}} U_k y_{k+\tau sync} \quad (5)$$

where $\hat{H}=[\hat{h}_0, \ldots, \hat{h}_L, \hat{m}]^T$, $U_k=[u_k, \ldots, u_{k-L}, e^{-j\Delta\omega t}]^T$, $N_{TS}$ is the number of training symbols, and $\tau_{sync}$ is the synchronization position. By adapting the offset frequency $\Delta\omega$ to the training sequence, the DC offset is also transformed into a rotating DC offset signal with a frequency $\Delta\omega$. Therefore, it is possible to reduce the uncertainty in the parameter estimates. One should choose the frequency offset, $\Delta\omega$, such that the matrix given as:

$$A = \left(\sum_{k=L+1}^{N_{TS}} U_k U_k^T\right)^{-1}$$

in equation (5) is a diagonal matrix or at least close to a diagonal matrix. After the channel estimation, the estimate of the rotating DC offset signal is subtracted from the de-rotated signal and the new signal $\check{y}_t = y_t - \hat{m}e^{-j\Delta\omega t}$ is fed to an equalizer 270 that uses the estimated channel filter taps to decode the signal.

The architecture of the invention can be extended in different ways. For example, since the DC offset can be several dB larger than the desired signal and in order to have a more efficient implementation, a coarse DC estimate based on averaging over the whole received burst can be computed and subtracted from the baseband signal before supplying it to the digital de-rotator 240. A coarse DC correction will still leave a residual DC offset that must be compensated for as described above.

In the following descriptions of the invention, reference numbers will be maintained between drawings where the items referenced are the same. Therefore, reference numbers for a particular figure and the general operation of the device may not be discussed where the information provided would be redundant.

Figure 3:
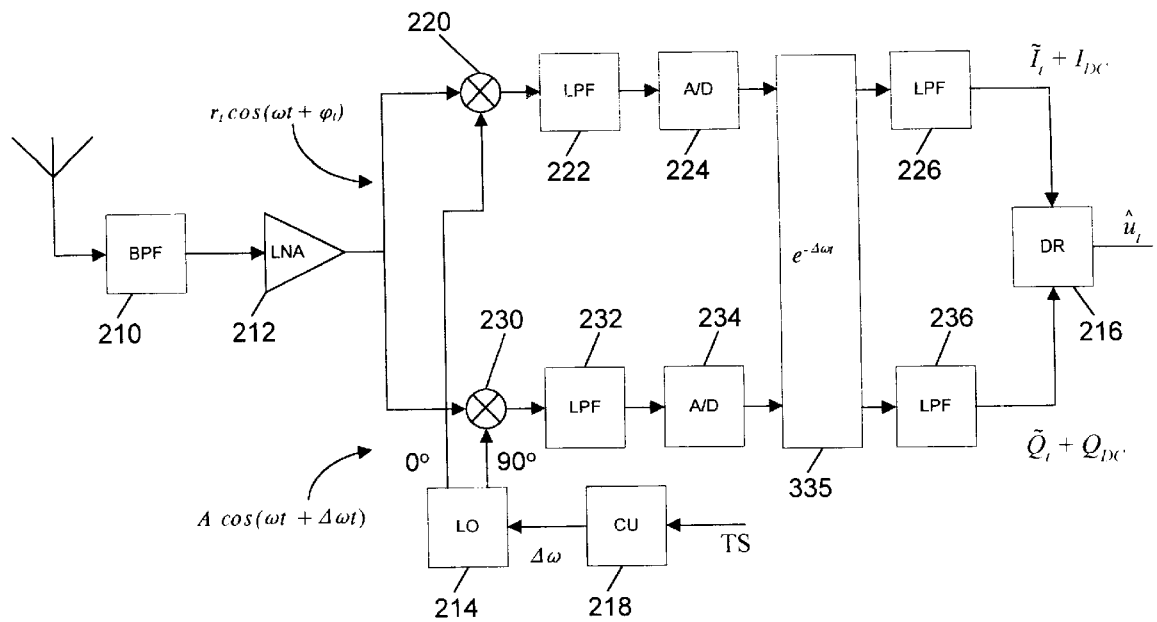
FIG. 3 is a block diagram of a homodyne receiver with another embodiment of the invention.

Another embodiment of a receiver that enhances the performance in the presence of adjacent channel interferers is shown in FIG. 3. The components of the receiver can be rearranged such that a digital de-rotator 335 is inserted before the digital low pass filters 226 and 236 which act as channel filters that filter out adjacent channel interferers. The de-rotation is equivalent to a complex valued multiplication between I+jQ and $e^{-\Delta\omega t}$. Therefore, the de-rotator 335 is shown as a single element.

Figure 4:
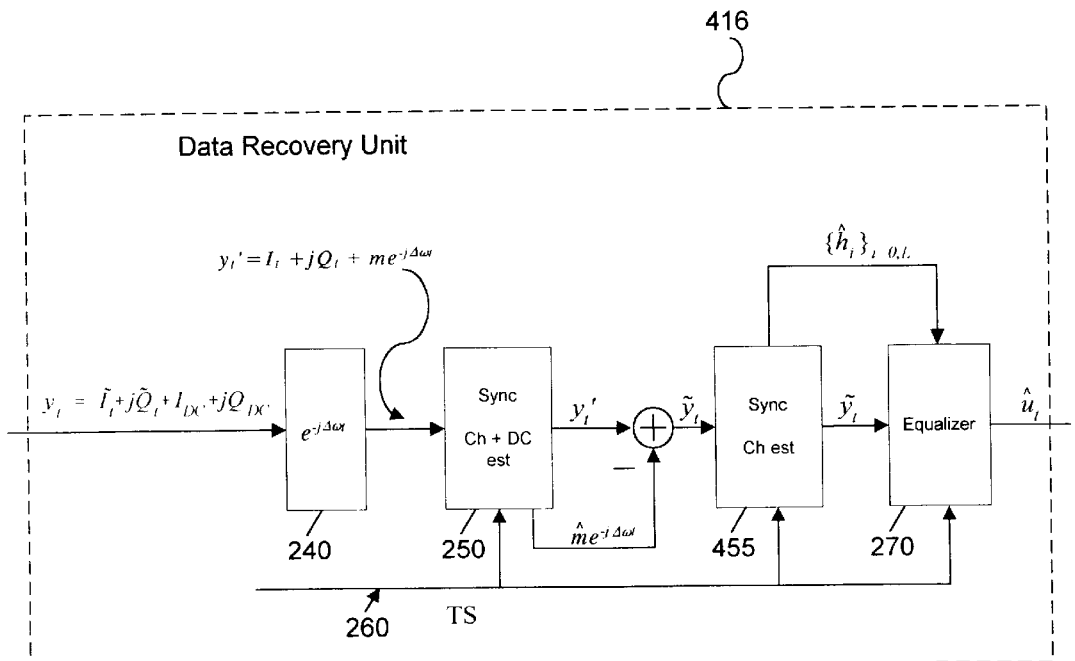
FIG. 4 is a block diagram of a data recovery unit with multiple synchronization and channel estimation units.

In yet another embodiment, a data recovery unit 416 that further enhances the overall receiver performance is shown in FIG. 4. A second synchronization and channel estimation unit 455 is added after the first synchronization and channel unit 250, in data recovery unit 416. The first synchronization and channel unit 250 provides a first channel estimation including an estimate of the rotating DC offset signal, as discussed previously. Also as previously described, after the channel estimation, the estimate of the rotating DC offset signal is subtracted from the de-rotated signal creating a new signal, $\check{y}_t = y_t - \hat{m}e^{-j\Delta\omega t}$. However, the new signal, $\check{y}_t$, fed into the second synchronization and channel estimation unit 455, instead of the equalizer 270, as previously described. Therefore, in the second synchronization and channel estimation unit 455, only the radio channel taps are estimated. The second channel estimate is then used in the equalizer 270 instead of the estimate obtained in the first synchronization and channel unit 250.

The foregoing has described the principles, preferred embodiments and modes of operation of the invention. However, the invention should not be construed as being limited to the particular embodiments discussed above. For example, the method of offsetting the LO frequency in the radio receiver with a frequency depending on the training sequence used and then performing a digital de-rotation with the same offset frequency before the channel and DC estimates is only one way to enhance the channel and DC estimates.

Therefore, the above-described embodiments should be regarded as illustrative rather than restrictive, and it should be appreciated that variations may be made in those embodiments by workers skilled in the art without departing from the scope of the invention as defined by the following claims.

What is claimed is:

1. A method of generating a local oscillator frequency in a radio receiver comprising:
    receiving a signal comprising a training sequence; and
    controlling the local oscillator such that it generates a signal having the local oscillator frequency that is equal to a carrier frequency of the received signal plus an offset frequency, wherein the offset frequency is based on the training sequence included in the received signal.

2. The method of claim 1 further comprising:
    looking up the offset frequency in a look-up table.

3. A method of generating a channel estimate from a received signal that has a training sequence and that is modulated onto a carrier signal having a carrier frequency, the method comprising:
    generating a mixing signal having a frequency that is the carrier frequency plus an offset frequency, wherein the offset frequency is a function of the training sequence;
    using the mixing signal to down convert the received signal to a baseband signal that includes a DC offset signal; and
    generating the channel estimate from a signal derived from the baseband signal.

4. The method of claim 3 further comprising:
    looking up the offset frequency in a look-up table.

5. The method of claim 3, wherein the signal derived from the baseband signal is generated by:
    filtering I and Q components of the baseband signal with low pass filters;
    converting the I and Q components to digital signals;
    filtering the digital signals with digital low pass filters, thereby generating filtered digital signals; and
    de-rotating the filtered digital signals to compensate for the offset frequency, thereby generating the signal derived from the baseband signal.

6. The method of claim 3, wherein the signal derived from the baseband signal is generated by:
    filtering I and Q components of the baseband signal with low pass filters;
    converting the I and Q components to digital signals;
    de-rotating the digital signals to compensate for the offset frequency, thereby generating de-rotated digital signals; and filtering the de-rotated digital signals with digital low pass filters, thereby generating the signal derived from the baseband signal.

7. The method of claim 3 further comprising:

using the channel estimate to recover information from the received signal.

8. The method of claim 3 further comprising:

determining a coarse DC estimate based on an average over an entire received burst; and subtracting the coarse DC estimate from the baseband signal.

9. The method of claim 3, wherein generating the channel estimate from the baseband signal comprises:

generating a first channel estimate including an estimate of a rotating DC signal from the signal derived from the baseband signal;

subtracting the estimate of the rotating DC offset signal from the signal derived from the baseband signal, thereby creating a new signal;

generating a second channel estimate using the new signal; and providing the second channel estimate as a second channel.

10. A radio receiver comprising:

an antenna for receiving a signal comprising a training siquence; and a local oscillator that generates a local oscillator signal having an oscillating frequency that is offset from a carrier frequency of the received signal by an offset frequency, wherein the offset frequency is based on the training sequence included in the received signal.

11. The receiver of claim 10 further comprising:

a control unit that receives the training sequence and provides the offset frequency to the local oscillator, wherein the control unit uses a look-up table to provide the offset frequency for the training sequence received.

12. The receiver of claim 10 further comprising:

mixers that down convert the received signal to a baseband signal using the local oscillator signal, wherein the baseband signal includes a DC offset signal;

low pass filters that filter I and Q components of the baseband signal; and analog to digital converters that convert the I and Q components to digital signals.

13. The receiver of claim 12 further comprising:

digital low pass filters that filter the digital signals, thereby generating filtered digital signals;

a digital de-rotator that de-rotates the filtered digital signals to compensate for the offset frequency, thereby generating de-rotated digital signals; and a data recovery unit that demodulates the de-rotated digital signals to recover information from the received signal.

14. The receiver of claim 13, wherein the data recovery unit comprises:

a first synchronization and channel estimation unit that receives the de-rotated digital signals and the training sequence and generates a first channel estimate including an estimate of a rotating DC signal;

a summer that subtracts the estimate of the rotating DC signal from the de-rotated digital signals, thereby forming a new signal;

a second synchronization and channel estimation unit that uses the new signal to generate a second channel estimate; and an equalizer, that uses the new signal and the second channel estimate.

15. The receiver of claim 12 further comprising:

a digital de-rotator that de-rotates the digital signals to compensate for the offset frequency, thereby generating de-rotated digital signals;

digital low pass filters that filter the de-rotated digital signals, thereby generating filtered digital signals; and a data recovery unit that demodulates the filtered digital signals to recover information from the received signal.

16. The receiver of claim 12 further comprising:

a coarse DC estimator that calculates a coarse DC estimate based on an average over an entire received burst and subtracts the coarse DC estimate from the baseband signal.

17. The receiver of claim 12, wherein the I and Q components each include an unwanted DC offset.

18. The receiver of claim 10, wherein the radio receiver is a homodyne receiver.

* * * * *